Feb. 5, 1963  M. L. BENJAMIN ETAL  3,076,357
SPADE DRILL BLADE
Filed Aug. 21, 1961

*INVENTORS*
MILTON L. BENJAMIN &
BY ELMER L. J. SYRENE

Oberlin, Maky & Donnelly

ATTORNEYS

United States Patent Office 3,076,357
Patented Feb. 5, 1963

3,076,357
SPADE DRILL BLADE
Milton L. Benjamin, Shaker Heights, and Elmer L. J. Syrene, Mentor, Ohio, assignors to Erickson Tool Company, Solon, Ohio, a corporation of Ohio
Filed Aug. 21, 1961, Ser. No. 132,972
3 Claims. (Cl. 77—68)

The present invention relates generally as indicated to a spade drill blade and more particularly to certain improvements in a spade drill blade of the type disclosed in the copending application of Milton L. Benjamin and Elmer L. J. Syrene, Ser. No. 814,522, filed May 20, 1959.

In general, it is well-known to provide so-called spade drills in which a blade is clamped in a holder and in which the holder is provided with passages for flow of coolant toward the cutting edges of the blade for cooling the blade and for flushing out the chips from the hole being drilled through flutes or flats formed on the opposite sides of the holder.

It is a main object of this invention to provide a novel disposition of the cutting edges at the end of a spade drill blade which results in much increased blade life, greatly increased production (low torque-fast feed), elimination of binding or chattering in use, and vast improvement in the straightness, smoothness, and accuracy of holes drilled thereby.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
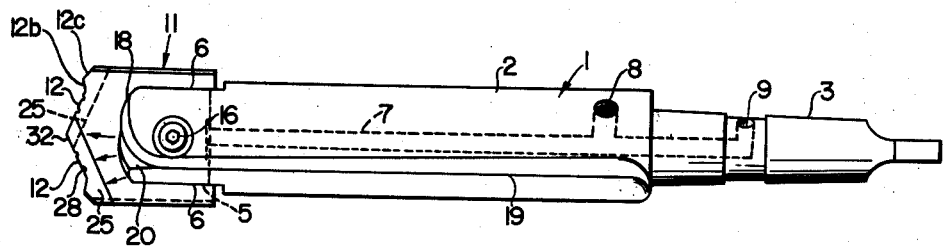
Figure 2:
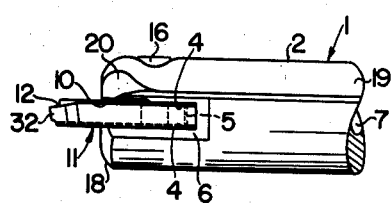
Figure 3:
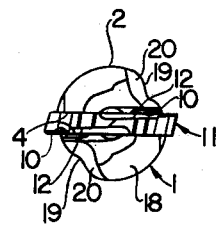
Figure 4:
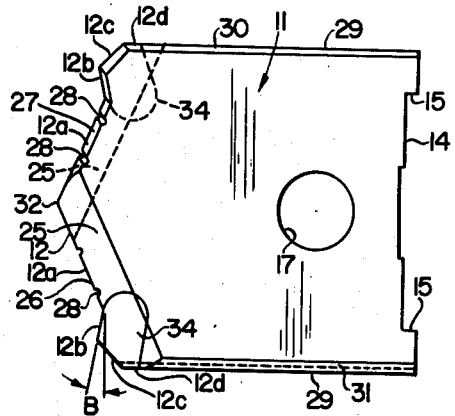
Figure 5:
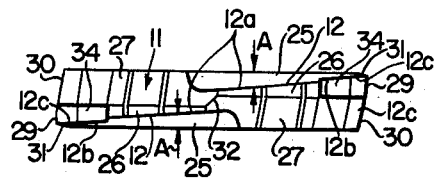
Figure 6:
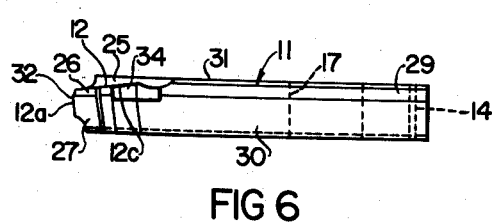

In said annexed drawings:

FIGS. 1, 2, and 3, are, respectively, top plan, side elevation, and end elevation views of a spade drill embodying the present invention; and FIGS. 4, 5, and 6 are respectively top plan, end elevation, and side elevation views showing a preferred form of spade drill blade embodying the improvements herein.

THE SPADE DRILL

(a) The Holder

As best shown in FIGS. 1 to 3, the holder 1 comprises an elongated cylindrical body 2, and a shank 3 by which the holder is adapted to be held in a machine spindle, lathe turret or the like.

The end of the body 2 is formed with a slot extending diametrically thereacross formed with parallel sides 4 that are eqidistant from the axis of the holder and with a flat bottom 5 which lies in a plane perpendicular to the axis of the holder. The slotted end of the holder is also formed with parallel flats 6 which are perpendicular to the opposite sides 4 and bottom 5 of the slot.

As shown, the holder 1 is formed with a central axially extending passage 7 which intersects the bottom 5 of the slot and terminates in radially extending passages 8 and 9 in the body 2 and in the shank 3 through which coolant is adapted to be supplied in well-known manner for flow through the passage 7 toward the slotted end of the holder. In the case of some tapered and all straight shank holders, such passage 7 may extend through the end of the shank.

The opposite sides 4 of the slot are formed with relatively thin and wide fan-shaped channels 10 which intersect the central coolant passage 7 so that in use, with a blade 11 mounted in place, the coolant will emerge from such flat and wide channels 10 in the form of wide film-like streams whereby coolant will flow toward the cutting edges of the blade 11 in the manner indicated by the arrows in FIG. 1. By way of example, in a holder 1 for a 1¾" wide blade 11 the depth of the channels 10 may be about ½₂" and the width at the mouths thereof may be about ½".

The blade 11 referred to has a pair of cutting edges 12 of special configuration (as hereinafter discussed in detail) at its pointed cutting end and is recessed at its other end to provide relieved locating faces 14 and 15 that respectively abut and embrace the flat bottom 5 of the holder slot and the parallel flats 6. The blade 11 is of thickness to have a close fit between the parallel sides 4 of the holder slot. The blade 11 is held in place as by means of the screw 16, which, when tightened, draws together the spaced portions of the slotted portion of the holder 1 into firm frictional engagement with the opposite faces of the blade. It is to be noted that the blade 11 is formed with a hole 17 transversely therethrough which is of diameter substantially larger than the body of the screw 16 so that the blade 11 will be accurately located in a coaxial position in the holder 1 through the aforesaid locating surfaces.

The slotted end of the holder 1 has a beveled or rounded nose 18 and on opposite sides of the blade 11, the body 2 of the holder is formed with a pair of longitudinally extending flutes 19 which preferably are of progressively increasing depth from the slotted end toward the shank end whereby to prevent congestion of chips therein. Preferably, the front ends of the flutes 19 are relieved as at 20 to provide added space for easy entry and smooth flow of chips into the flutes 19.

In any case, it is to be observed that the wide and shallow fan-shaped channels 10 that are formed in the holder 1 define with the opposite plane faces of the blade 11, a pair of wide and thin passages for emergence of corresponding streams of coolant from the central passage 7 directed toward the respective cutting edges 12 of the blade 11 to thus effect efficient cooling action.

(b) The Spade Drill Blade

The blade 11, as best shown in FIGS. 4, 5, and 6, essentially comprises a flat body of suitable material which is formed with a pointed cutting end including the aforesaid cutting edges 12. Also, as aforesaid, the blade 11 is formed with a hole 17 transversely therethrough and with the locating faces 14 and 15 at the other end by which the blade may be securely and accurately mounted in a holder, such as the holder 1 previously referred to.

Preferably, the cutting edges 12 of the blade 11 will be formed with top rake grooves 25 (of 5° angle A, 12° top rake angle, for example) and with primary and secondary relief surfaces 26 and 27 (of say 7° and 14° angles respectively or of say 12° angle when only a single relief is provided). Also, the cutting end will be formed with chip breaker grooves 28 if these are found desirable or necessary.

The sides of the blade 11 are preferably "cylindrical ground" to provide cylindrical guide surfaces 29 which engage the side of the hole being drilled, such faces 29 being relieved as at 30.

The side edges 29 of the blade 11 are preferably formed with top relief 31 so that the outermost corners of the cutting edges 12 will be circumferentially advanced with respect to the cylinder-ground side edges 29, this having been found to be very important in preventing "heeling" action and in eliminating binding and chattering of the drill and in eliminating cutting action by such side edges 29.

A characterizing feature of the top rake 25 is that it is ground as with a plain cylindrical wheel that has a rounded corner whereby there is greater strength at each cutting edge 12 as compared with known grinding techniques in which radius wheels are employed to make the top rake grooves of concavely curved form. Also, the present blade 11 employs a straight cut in the forming of the top rake grooves 25 whereas, the present known technique involves using a 3° offset between the grinding wheel and the cutting edge when forming the top rake. The top rake grooves 25 herein are inclined toward the chisel edge 32 (angle A of 5° as aforesaid) to reduce the web thickness to a minimum and thus enable easy penetration of the blade 11 into the work with light axial thrust loads. Because the radius of the rounded corner of the wheel is not critical herein, less frequent wheel dressing is required than in cases where the top rake grooves are of concavely curved form of prescribed radius. Because the portion of the top rake groove 25 adjacent to the cutting edge 12 is a plane surface rather than the conventional concave surface, the cutting edge 12 is greatly strengthened to the extent that double or triple feeds may be employed. For instance, the spade drill herein (without regard to the configuration of cutting edges 12) may be fed at the rate of .040" per revolution, as compared with the .015" to .020" per revolution when known grinding techniques are used.

For best results, the blade 11 may be of high speed steel with carbide or like inserts 34.

Referring now in detail to the configuration of the cutting edges 12, each comprises (starting at the chisel point 32) a straight high speed steel portion 12A defining with the other portion 12A the point angle of the drill blade 11, preferably of about 130° for general use of the drill, an intermediate carbide portion 12B at a slight angle B of about 10° as indicated, an outer carbide chamfer portion 12C preferably at an angle C of about 45° as indicated, and a side carbide portion 12D of the side edge 29. By way of example, for a drill of diameter D, the portions 12A should extend to a diameter of about 0.65 D (or 1.125" for a blade 11 of 1.750" diameter), and the portions 12B and 12C should intersect at a diameter of about 0.82 D (or 1.438" for a blade of 1.750" diameter).

In use, a blade 11 have cutting edges 12 made up of the respective portions 12A, 12B, 12C, and 12D, will function as a spade drill according to the copending application to a diameter of about 0.65 D, whereafter the 10° portions 12B have a thrust-balancing effect on the 45° chamfer portions 12C and a run-off eliminating effect whereby the spade drill will form a clean, straight hole. The carbide portions 12B, 12C, and 12D also are effective to substantially decrease torque on the blade 11 while enabling increase in feed. The disposition of the inserts 34 also eliminates the presence of brazing material as part of the cutting edge, and, in addition, grinding is facilitated in that only one material at a time is presented to the grinder i.e. the high speed steel edges 12A and then the carbide edges 12B and 12C.

SUMMARY

From the foregoing, it can be seen that the present invention provides a new form of spade drill blade 11 having a unique configuration of the cutting edges 12. As aforesaid, the effective coolant supply through the thin and wide fan shaped channels 10 to the cutting edges 12 of the blade under the chips curled by curling grooves 25, and the novel top rake grooves 25 provide for greatly enhanced life of the blade 11, together with quicker, more accurate drilling of smooth and round holes with greater rates of feed than currently are possible. Also, the top relief 31 of the side cylindrical grind 29 of the blade 11 positions the outer corners and portions 12C of the cutting edges 12 circumferentially ahead of the blade guide surfaces 29 so as to eliminate "heeling" action and to eliminate binding and cutting action by the sides of the blade.

In conclusion, several features of this invention contribute to greater accuracy in the drilling of holes in workpieces, much increased blade life, and much greater feeds (50% to 100% or more) at reduced horsepower.

It is to be understood that the blade guide surfaces 29 may be cylindrical-ground with conventional back-taper, for example, .001 inch/inch of length of the sides of the blade 11.

Yet another feature of this invention is that the blade 11 may be employed as a core drill blade in which portions 12B, 12C, and 12D of the cutting edges 12 are used to enlarge a cored hole or a previously drilled hole of 0.82 D diameter or less. Furthermore, the present drill may be used for drilling through combination solid and cored holes, thus eliminating a double pass comprising the use of a standard drill and a core drill. The present drill also is self-aligning, eliminates break-through jump and chatter, and can be used for deep hole drilling without wander, aside from its advantages of increased feed rate and longer life.

Other modes of applying the principle of the invention may be employed, change being made as regards the details described, provided the features stated in any of the following claims, or the equivalent of such, be employed.

We therefore particularly point out and distinctly claim as our invention:

1. A spade drill blade comprising a block having parallel top and bottom plane faces, a pointed cutting end, and parallel side faces, said cutting end being formed with a pair of cutting edges effective to drill a hole in a workpiece when said blade is rotated and fed axially against the workpiece, said side faces being formed to guide said blade in the drilled hole and being formed with leading edges that are in circumferentially trailing relation with respect to the radially outer corners of said cutting edges thus to eliminate "heeling" action of said blade in use, said cutting edges defining an obtuses point angle and each being of zigzag form from the point to such outer radially outer corners, said blade having first cutting edge portions defining the point angle extending to a width of about 65% of that of the blade, and second adjoining and reversely inclined cutting edge portions extending to a width of about 82% of that of the blade.

2. The blade of claim 1 wherein third cutting edge portions of steeper inclination than said first portions extend from said second portions to the full width of the blade.

3. The blade of claim 2 wherein said first, second, and third portions are disposed at angles of about 65°, 100°, and 45° respectively with respect to a line bisecting the point angle.

References Cited in the file of this patent

UNITED STATES PATENTS

| 2,400,856 | Thompson | May 21, 1946 |
| 2,858,718 | Kohler | Nov. 4, 1958 |
| 2,936,658 | Riley | May 17, 1960 |

FOREIGN PATENTS

| 123,605 | Great Britain | Mar. 5, 1919 |